US008566077B2

(12) United States Patent
Ander et al.

(10) Patent No.: US 8,566,077 B2
(45) Date of Patent: Oct. 22, 2013

(54) SIGN LANGUAGE TRANSLATOR (76) Inventors: Barbara Ander, Forth Worth, TX (US); Sidney Ander, Fort Worth, TX (US)

(*) Notice: Subject to any disclaimer, the term of this patent is extended or adjusted under 35 U.S.C. 154(b) by 421 days.

(21) Appl. No.: 12/843,622

(22) Filed: Jul. 26, 2010

(65) Prior Publication Data

US 2010/0291968 A1    Nov. 18, 2010

Related U.S. Application Data (63) Continuation-in-part of application No. 12/030,805, filed on Feb. 13, 2008, now abandoned.

(60) Provisional application No. 60/901,004, filed on Feb. 13, 2007.

(51) Int. Cl.
*G06F 17/28*    (2006.01)

(52) U.S. Cl.
USPC .............. 704/2; 704/3; 704/7; 704/9; 704/10; 704/271

(58) Field of Classification Search
USPC ..................................... 704/2, 3, 7, 10, 271, 9
See application file for complete search history.

(56) References Cited

U.S. PATENT DOCUMENTS

| | | | |
|---|---|---|---|
| 5,047,952 A * | 9/1991 | Kramer et al. | 704/271 |
| 5,481,454 A | 1/1996 | Inoue | |
| 5,544,050 A | 8/1996 | Abe | |
| 5,659,764 A | 8/1997 | Sakiyama | |
| 5,734,923 A | 3/1998 | Sagawa | |
| 5,741,136 A * | 4/1998 | Kirksey et al. | 434/169 |
| 5,953,693 A | 9/1999 | Sakiyama | |
| 5,990,878 A | 11/1999 | Ikeda | |
| 6,154,757 A * | 11/2000 | Krause et al. | 715/205 |
| 6,377,925 B1 | 4/2002 | Greene, Jr. | |
| 6,460,056 B1 | 10/2002 | Horii | |
| 6,549,887 B1 | 4/2003 | Ando | |
| 6,760,010 B1 * | 7/2004 | Webb | 345/168 |
| 7,277,858 B1 | 10/2007 | Weaver | |
| 7,308,479 B2 | 12/2007 | Ando | |
| 2001/0030850 A1 | 10/2001 | Ditzik | |
| 2002/0063690 A1 | 5/2002 | Chung et al. | |
| 2003/0223455 A1 | 12/2003 | Rashdan | |
| 2004/0034522 A1 | 2/2004 | Liebermann | |
| 2004/0044517 A1 | 3/2004 | Palmquist | |
| 2004/0143673 A1 | 7/2004 | Kristjansson | |
| 2005/0004801 A1 * | 1/2005 | Liebermann | 704/271 |
| 2005/0033578 A1 | 2/2005 | Zuckerman | |

(Continued)

*Primary Examiner* — Qi Han
(74) *Attorney, Agent, or Firm* — James E. Walton; Damon R. Hickman (57) ABSTRACT A digital sign language translator has a case configured to be supported by a hand of a user, a touch screen display located on a face of the case, a microprocessor for selectively translating words, letters, and numbers into video clips of an actual person performing a sign language translation. The translator has an internal memory device for storing a standard database selected words, letters, and numbers and the corresponding video clip of an actual person performing a sign language translation of words, letters, and numbers. The translator further includes a memory card slot for receiving an external memory card, the external memory card having an expanded vocabulary to supplement the standard database contained on the internal memory. The translator further includes a battery for powering the translator and a keyboard selectively shown on the touch screen display. The digital sign language translator is small and portable so as to be conveniently transported by the user in order to be handily available to the user as desired.

15 Claims, 11 Drawing Sheets

(56) References Cited

U.S. PATENT DOCUMENTS

| | | |
|---|---|---|
| 2006/0134585 A1 | 6/2006 | Adamo-Villani |
| 2007/0291910 A1* | 12/2007 | Bucchieri et al. .......... 379/88.06 |
| 2008/0039124 A1 | 2/2008 | Linder |
| 2008/0120102 A1 | 5/2008 | Rao |
| 2008/0163130 A1 | 7/2008 | Westerman |
| 2008/0191876 A1* | 8/2008 | Kostrzewski et al. ..... 340/572.1 |
| 2009/0070820 A1* | 3/2009 | Li .................................. 725/62 |
| 2009/0153289 A1* | 6/2009 | Hope et al. ..................... 340/5.1 |
| 2009/0189981 A1* | 7/2009 | Siann et al. ................... 348/143 |
| 2010/0059649 A1* | 3/2010 | Buxton ........................ 248/371 |

\* cited by examiner

SIGN LANGUAGE TRANSLATOR

CROSS REFERENCE TO RELATED APPLICATIONS

This application is a continuation-in-part of U.S. application Ser. No. 12/030,805, filed 13 Feb. 2008, titled "Digital Sign Language Translator," which is hereby incorporated by reference for all purposes as if fully set forth herein, and which claims the benefit of U.S. Provisional Application No. 60/901,004, filed 13 Feb. 2007, titled, "Sign Language Pocket Translator," which is hereby incorporated by reference for all purposes as if fully set forth herein.

BACKGROUND

1. Field of the Invention

The system of the present application relates to digital dictionaries and digital foreign language translators.

2. Description of Related Art

Digital dictionaries and digital foreign language translators have been around for many years. Many of these devices allow a user to input a word or phrase in English, and then the device displays the meaning of the word or its foreign language equivalent on a display screen.

Although great strides have been made in the area of digital dictionaries and digital foreign language translators, considerable shortcomings remain.

DESCRIPTION OF THE DRAWINGS

The novel features believed characteristic of the system are set forth in the description. However, the system itself, as well as, a preferred mode of use, and further objectives and advantages thereof, will best be understood by reference to the following detailed description when read in conjunction with the accompanying drawings, wherein.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the system as described herein.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1:
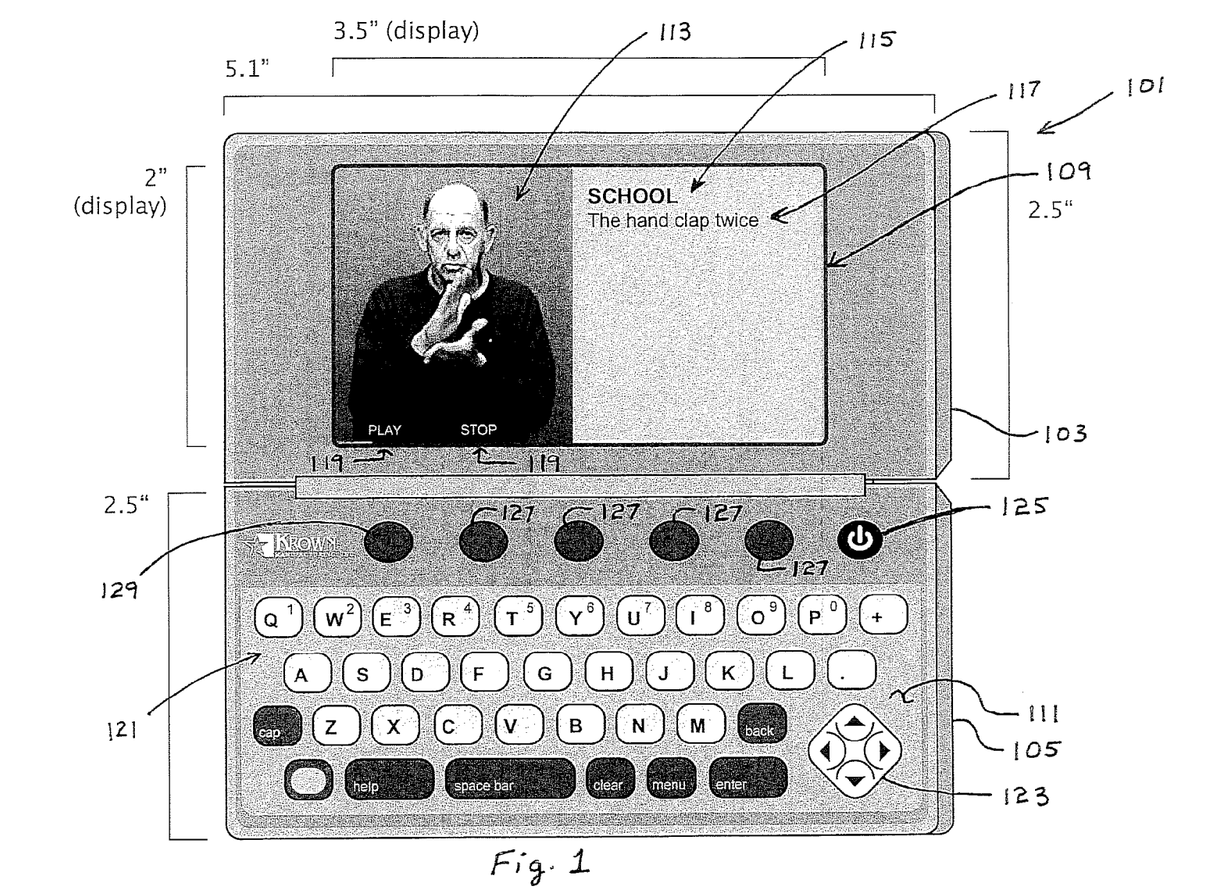
FIG. 1 is a perspective view of an alternative embodiment of a digital sign language translator according to the present application.

Referring to FIG. 1 in the drawings, an alternative embodiment of a digital sign language translator 101 according to the present application is illustrated. In this embodiment, translator 101 is configured as a small hand-held electronic device, similar in size and shape to personal digital assistants (PDA's), cell phones, or personal organizer. As such, the functionalities of translator 101, as disclosed herein, may be incorporated into a PDA device, such as a cell phone, smart phone, or other PDA type device. In the example of FIG. 1, translator 101 has been shown as a small, clamshell-type, hand-held device having a top portion 103 and a bottom portion 105, in which top portion 103 is hingedly coupled to bottom portion 105 to form a hinged case 107. It will be appreciated that translator 101 may take on a wide variety of configurations. For example, instead of a clamshell configuration, top portion 103 may slide or translate relative to bottom portion 105, or top portion 103 may pivot or twist relative to bottom portion 105, or top portion 103 may move in a combination of translations and rotations relative to bottom portion 105. Further, translator 101 may be configured to just have a top portion 103, without bottom portion 105.

Translator 101 includes one or more data input devices, one or more output devices, one or digital memory devices, and at least one microprocessor for controlling and performing the various features and functions of translator 101. Translator 101 is an electronic device powered by one or more electronic power sources. Preferably, translator 101 is powered by one or more DC batteries. In one embodiment, translator 101 is powered by rechargeable batteries that are recharged by connecting translator to another power source, such as a transformer that is plugged into an AC power outlet, a docking station or cradle via a terminal-to-terminal connection, a personal computer via a universal serial bus (USB) or other type of connection, or any other type of recharging means. Translator 101 may include a wide variety of input, output, and data transfer devices and ports. For example, translator 101 may include one or more USB ports, one or more external digital memory card slots, disc drives, one or more control switches or buttons, infrared (IR) data transfer ports, wireless communication antennas, microphones, speakers, cameras, and selected integrated circuits and chip sets.

In the example of FIG. 1, a digital video display 109 is carried by top portion 103 and a keypad portion 111 is carried by bottom portion 105. In the preferred embodiment, display 109 is divided into one or more display areas. For example, display 109 includes a "video" area 113, a "dictionary" area 115, a "description" area 117, and a "function" area 119. Video area 113 is used to display videos of people carrying out the hand, finger, and body motions of selected words and phrases in sign language. Dictionary area 115 is used to display the words or phrases that the user has input. Description area 117 is used to display textual or graphic instructions of how to carry out the finger hand, and body motions of selected words and phrases in sign language. Function area 119 is used to identify selected keys or key combinations that when pressed cause translator to carry out certain preprogrammed or programmable instructions. It should be understood that display 109 may have many other "areas" and functions, depending upon the application in use and the mode of operation in which translator 101 is operating. Furthermore, it will be appreciated that display 109 may also be a touch screen type display. As such, display 109 may serve as both an input means and an output means. When display 109 is configured in a tough screen configuration, keypad portion 111 may be integrated into the display 109 such that the user makes keypad entries on the touch screen display. It should be appreciated that in an embodiment wherein display 109 is used as a touch screen, display may be a large screen covering a substantial portion of a face of translator 101.

Keypad portion 111 may be divided into selected areas. For example, keypad portion 111 may include a QWERTY type keyboard 121, or may include a smaller number of keys that are capable of performing, such as by software, entry of alpha-numeric data. Keypad 111 may include one or more directional keys, such as directional button 123, and may include one or more joysticks, touch pads, or mouse pads. A power button or switch 125 is included for switching translator 101 between an on mode and an off mode. One or more programmable function keys 127 may also be included on keypad 111. Programmable function keys may be preprogrammed or user programmable. For example, a function key 129 may be aligned with a particular option in the function area of display 109, such that when the user presses function key 129, translator 101 performs the function indicated in the corresponding function area. As shown in FIG. 1, if the user were to press function key 129, translator 101 would "PLAY" the video. Programmable function keys 127 may also be programmed for use with commonly used words or phrases.

Figure 2:
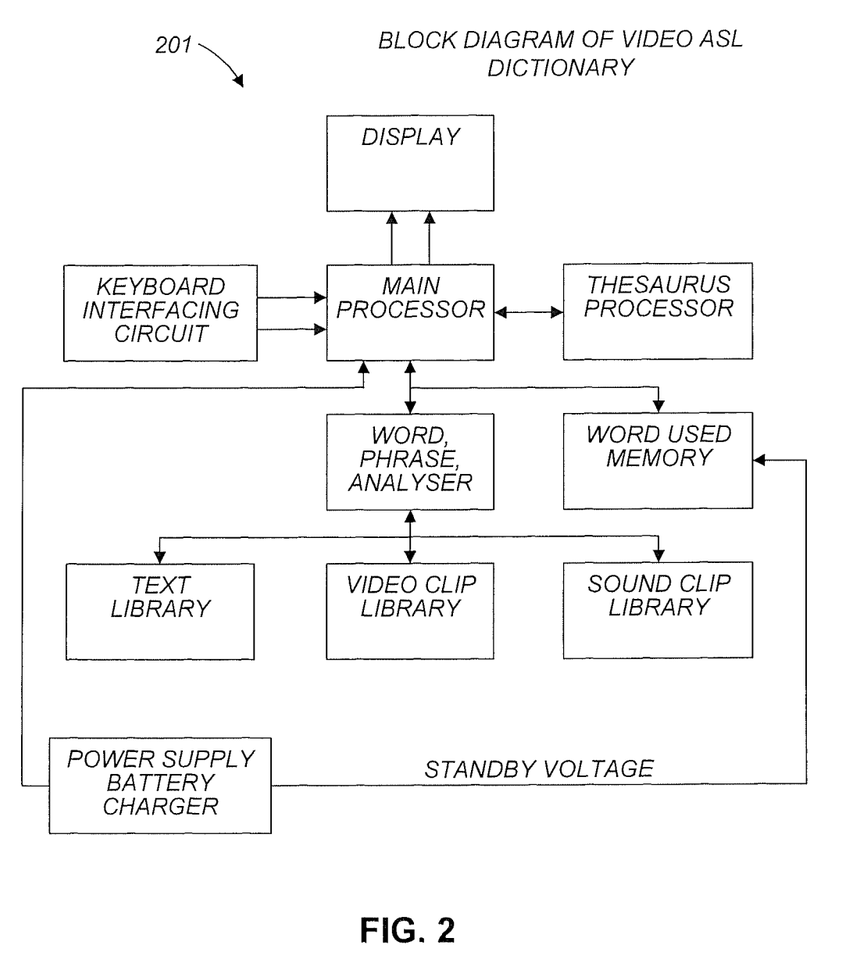
FIG. 2 is a high-level block diagram of the digital sign language translator system of the present application.
Figure 3:
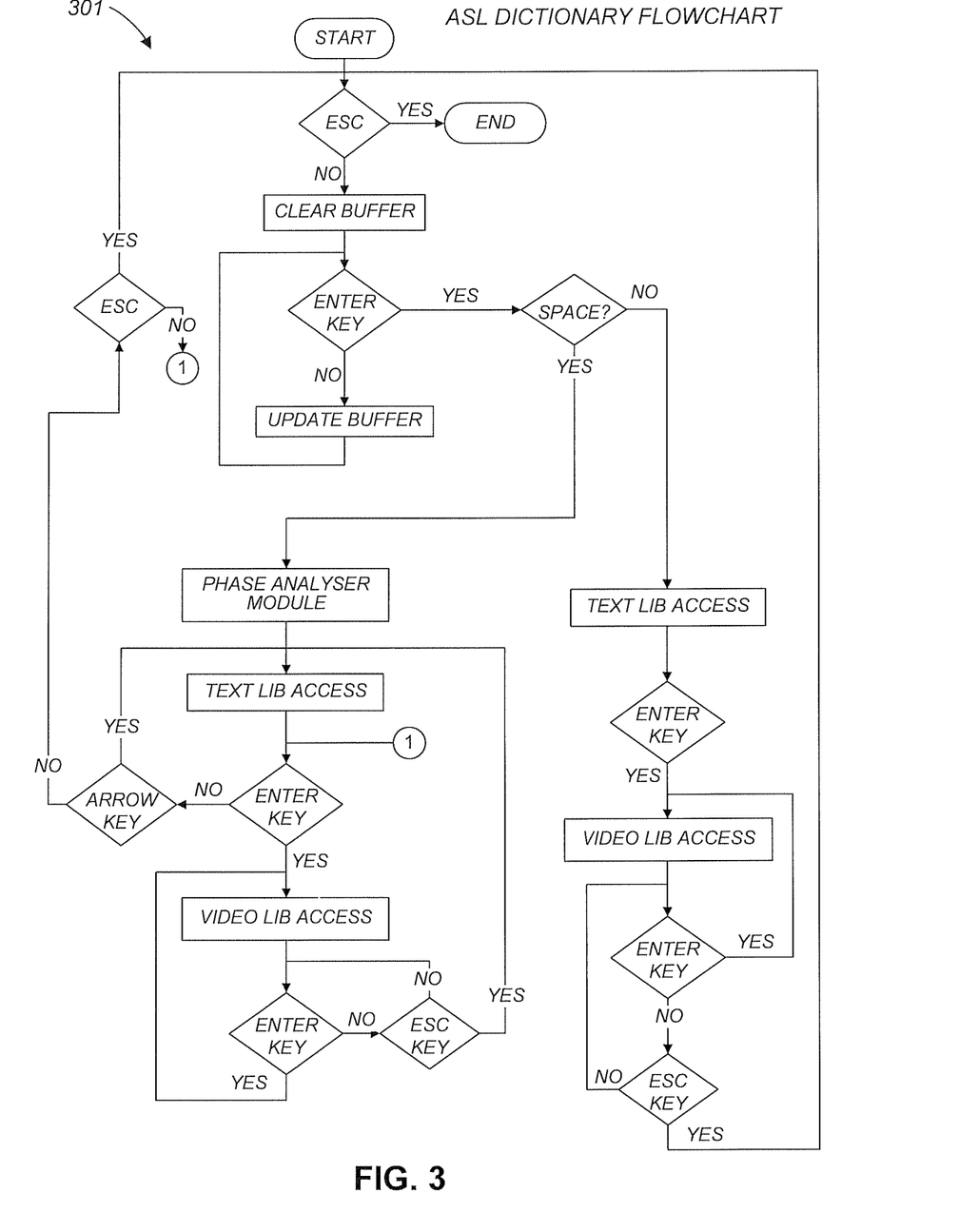
FIG. 3 is a flowchart of the dictionary feature of the digital sign language translator system of the present application.
Figure 4:
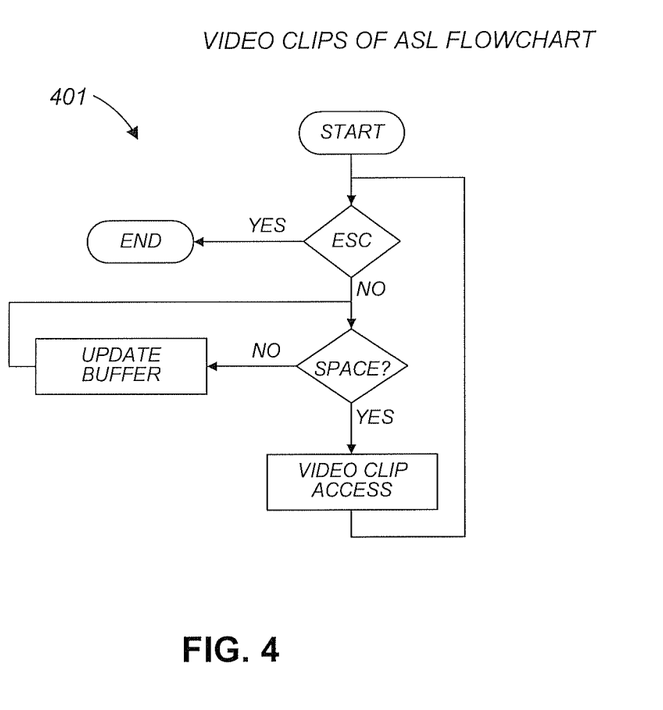
FIG. 4 is a flowchart of the video clips of ASL flowchart of the digital sign language translator system of the present application.

Referring now also to FIGS. 2-4 in the drawings, a portion of the functionality of one embodiment of translator 101 is illustrated. FIG. 2 shows a high-level block diagram 201 of translator 101, FIG. 3 shows a flowchart 301 of the dictionary feature of translator 101, and FIG. 4 shows a flowchart 401 of the video clips of ASL feature of translator 101.

The microprocessor and the memory devices store one or more databases, including a dictionary database of words and phrases and a database of videos of finger, hand, and body motions that represent certain sign language letters, words, and phrases. Software stored in the microprocessor and/or the memory devices receives input data from the user and causes the appropriate video, graphics, and/or text to be displayed on display 109. For example, if the user enters the letter "S," then a list of words or phrases beginning with the letter "S" is displayed in one of the areas of display 109. Then, the user can either choose one of the words from the list or enter additional letters. Once the user chooses a word from the list, such as "SCHOOL," the corresponding video of the sign language interpretation of the word "SCHOOL" is displayed and played in video area 113 of display 109. Also, the word "SCHOOL" would be displayed in dictionary area 115 and the instruction "The hands clap twice," would be displayed in description area 117 of display 109. The user may use certain function keys 127 and 129 to manipulate the playing and repeating of the video.

It will be appreciated that translator 101 may be programmed to operate in many different modes, including a "word" mode, which is described above, a "phrase" mode, in which phrases are entered and/or displayed. Other modes of operation include a synonym mode, in which synonyms are displayed; a homonym mode, in which homonyms are displayed; a thesaurus mode, in which words with similar meanings are displayed; mistyped word mode, in which digital logic techniques may be utilized to predict what the user meant; and a slang mode, in which slang words and phrases are included. Translator 101 may be designed and programmed to operate at various user levels, such as skill levels and learning levels. In addition, translator 101 may be programmed to include, or may be upgradeable to include certain words and phrases that may be specific to different businesses and industries, such as medical, legal, and engineering, and may include multiple sign language translations for a single word or phrase, such as different dialects or base languages. External memory cards are particularly well suited for carrying out such modifications and upgrades to translator 101.

Translator 101 may be updated and upgraded via wired communication links, wireless communication links, memory cards, disc drives, and by synchronization with computers or computer networks. In addition, it will be appreciated that translator 101 may include a wide variety of other features and components that may or may not be directly related to sign language translation, such as date books, calendars, clocks, address books, calculators, word processors, cell phones, PDA's, pagers, vibrating devices and alarms, The system of the present application may also be carried out and practiced as a digital sign language translator system. In the "system" embodiment, the user may access the system remotely via a wired or wireless communication network or system, such as the Internet. For example, the user might log on to a designated Internet Webpage and perform certain features and functions. The user could enter words and phrases into fields on the Webpage, and the system could display the corresponding videos and other information related to the user's requests. In another embodiment of the system, the translator may be entirely carried out by software that is installed and run on a computing device, such as a computer, cell phone, PDA, or other computing device.

In addition, the system may also be implemented via a kiosk system in which kiosks are located and accessed at selected locations, such as schools, universities, airports, hospitals, retail outlets, or any other public place. The kiosk system could consist of one or more stand-alone devices, or the individual kiosks could be networked together and controlled and maintained by a central server.

In another embodiment, translator 101 may be configured as a "pay-as-you-go" system, in which all available features and functions may reside on translator 101, but the user must pay a selected amount of money to have each of the features and functions activated.

Translator 101 has a wide variety of modes of operation, including: (1) a "translate" mode, in which a user inputs a word or phase and translator 101 displays a video of the corresponding sign language; (2) a "learn" mode, in which a user interactively practices her sign language skills; (3) a "test" mode, in which the user takes tests to confirm his skills; (4) an "administration" mode, in which other functions and features are used, including upgrading and maintaining the databases; as well as many other possible modes of operation.

Figure 5:
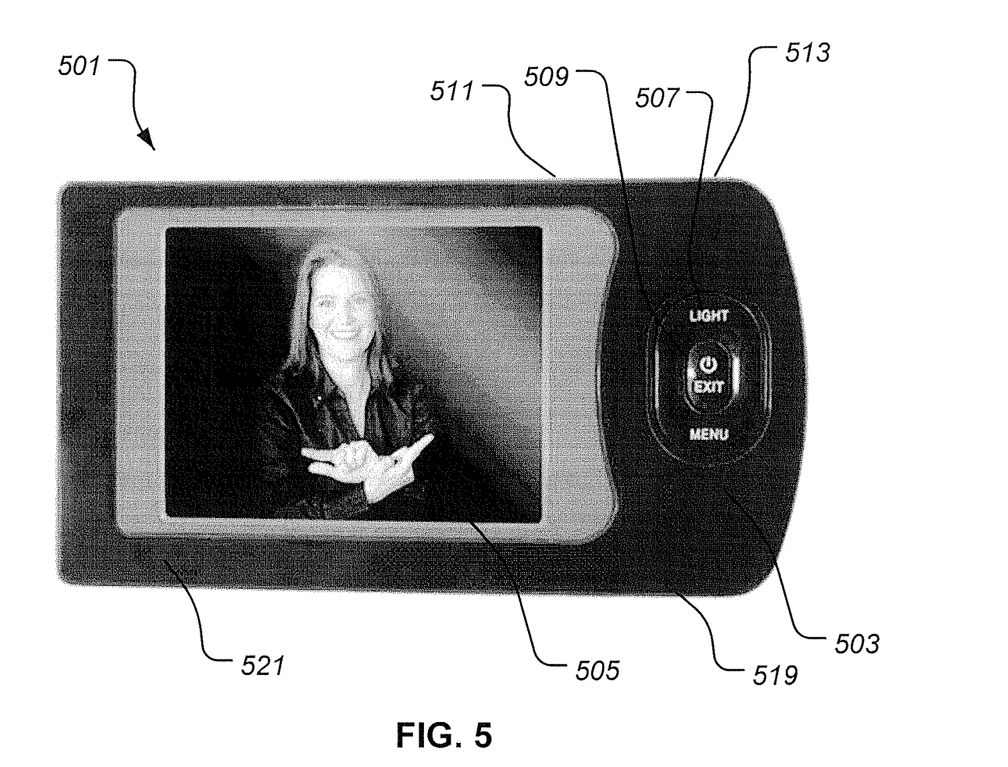
FIG. 5 is a front view of the preferred embodiment of a digital sign language translator according to the present application.
Figure 6:
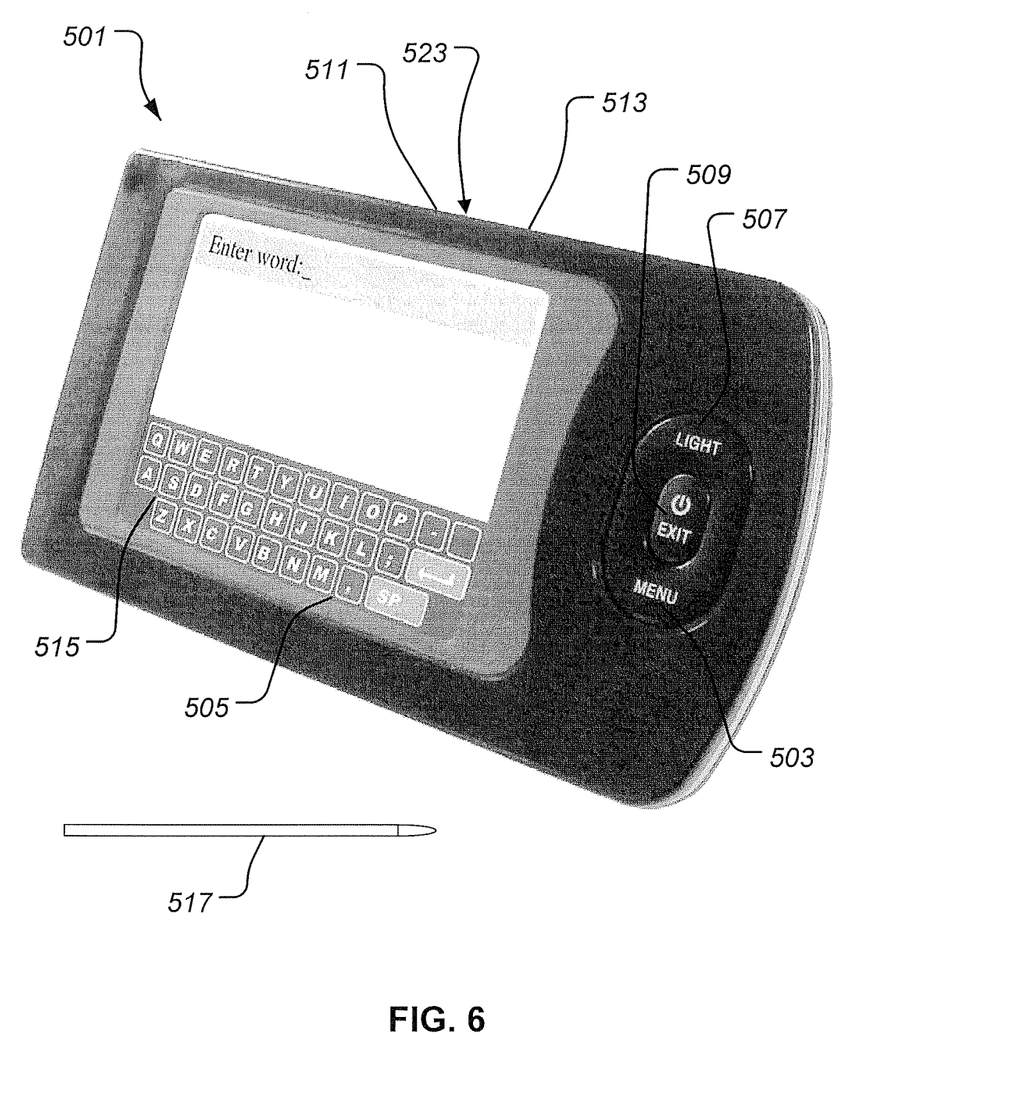
FIG. 6 is perspective view of the preferred embodiment of a digital sign language translator according to the present application.
Figure 7:
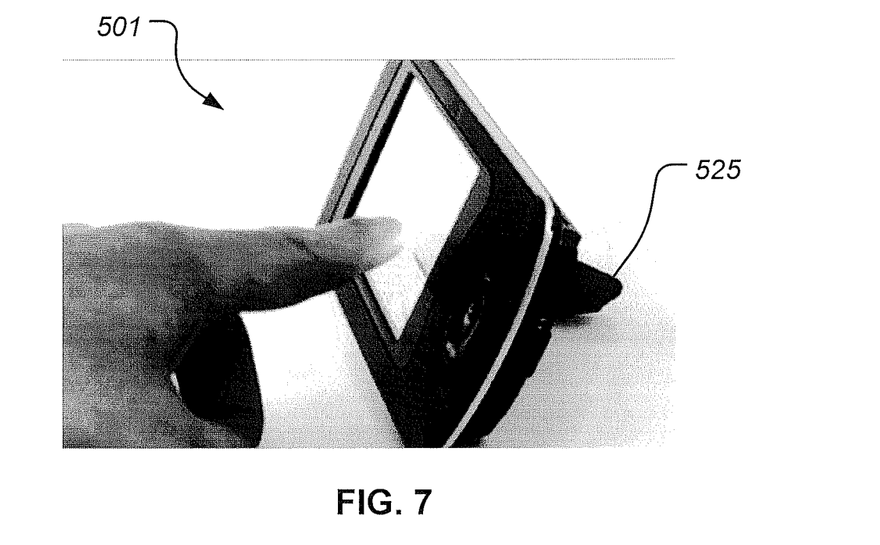
FIG. 7 is another perspective view of the preferred embodiment of a digital sign language translator according to the present application.

Referring now to FIGS. 5 and 6, a preferred embodiment of a translator 501 is depicted. Translator 501 is similar to translator 101 in form and functionality; however, translator 501 is configured to be a limited use device in order to facilitate portability and ease of use as a translator. Further, translator 501 is limited to certain translator specific functions in order to limit the costs associated with development and manufacturing of translator 501, thereby providing a user with a device that is affordable while providing the desired translator functionality. In order to facilitate portability and ease of use, the preferred embodiment of translator 501 includes a handheld case 519 for housing translator 501. Case 519 is approximately 3.1 inches high, 5.6 inches wide, and 0.75 deep. Translator 501 weighs approximately 5.9 ounces. It should be appreciated that alternative embodiments of translator 501 may be of different sizes and weights while maintaining a handheld size. Referring to FIG. 7, translator 501 is shown with a stand 525 so that the user has the option of holding it in their hand, or placing it on the a supporting surface with stand 525.

The preferred embodiment of translator 501 has a display 505 which is configured as a touch screen. Display 505 is positioned on a face 521 of translator 501. As shown in FIG. 5, translator 501 is used to display videos of people carrying out the hand, finger, and body motions of selected words and phrases in sign language on display 505, similar to translator 101. Inputs onto touch screen display 505 may be made with a user's finger, or the inputs may be made by other means, such as a stylus pen 517. Stylus pen 517 is removably coupled to translator 501 for convenience. A light button 507 allows the user to change the viewing contrast of display 505. A power button 509 allows for translator 501 to be turned on and off. Further, power button 509 allows for the exit from menu entries when navigating through menu options. Translator 501 further includes a menu button 503 for selectively toggling through categories. For example, a user can selectively choose categories of items the user would like translated. For example, the user can toggle to a "word" category in which words are translated from a written language into a video of a person performing a sign language interpretation of the word. In the preferred embodiment, the video of the sign language interpretation is performed in American Sign Language (ASL). Other exemplary categories which can be implemented with menu button 503 are "letters", "numbers", and "pronouns." As a further example, the user can choose the letter category which will result in translator 501 progressively displaying sign language video clips of the of the letters.

Furthermore, if a user toggles to the "word" category, then types a word that is not stored on the database, translator 501 automatically displays a video translation of the word in multiple letters without giving the user the option. In an alternative embodiment, the user is prompted to choose whether the user would like a video translation of the word in multiple letters in lieu of a video translation of the word. In such an embodiment, the user can then make a decision based upon the circumstance. FIG. 6 illustrates translator 501 is a "word entry" mode which allows the user to enter words, letters, numbers, and pronouns from a language which the user desires to have interpreted into a video of a person performing the words, letters, numbers, and pronouns into a sign language. Conversely, FIG. 5 illustrates the translator 501 in a "video" mode which uses the display to show the video of a person performing the words, letters, numbers, and pronouns in sign language. In word entry mode, the user may enter a first letter of a desired word such that a list of words which start with the first letter are displayed on display 505 such that the user can then either choose the word or enter additional letters of the desired word.

Translator 501 includes a universal serial bus (USB) cable port 513, on a side wall 523 of case 519, for conveniently charging a battery within translator 501. In the preferred embodiment, port 513 is configured so that data is not allowed to be transferred via the USB cable. This feature acts to help prevent unauthorized downloading and copying of files to and from translator 501. Further, translator 501 includes a memory card slot 511 for reading non-volatile memory cards, such as memory cards in a Secure Digital (SD) or Multi Media Card (MMC) format. Translator 501 is configured, in the preferred embodiment, such that the standard database of words, letters, numbers and pronouns, and their associated video translations into ASL, are stored on internal memory within translator 501. For example, the standard database on translator 501 includes approximately 3500 of translated words in video clips. However, memory cards having expanded vocabulary may be individually inserted into memory card slot 511 so as to supplement the standard database. Expanded vocabulary subjects may include translations relevant to a variety of daily life involvements and careers, such as, government service worker, school teacher, police officer, emergency personnel, hotel clerk, grocery clerk, and cab driver, to name a few. In addition, the expanded vocabulary may also include words, letters, and numbers in foreign languages, as well as foreign sign language videos interpretations. As such, changes to the expanded vocabulary in translator 501 are made by changing out memory cards within slot 511.

It should also be appreciated that translator 501 may include the option not only to translate words, letters, numbers, and pronouns of the English language, but may also translate words, letters, numbers, and pronouns from foreign languages into a sign language. Translator 501 can be configured to translate in one or more of the following setups: 1) from the English language to ASL, 2) from a foreign language to ASL, 3) from the English language to a foreign sign language, and 4) a foreign language to a foreign sign language. For example, the user may choose a Spanish mode with allows the user to enter a Spanish word to be translated into a sign language, such as ASL. Further, translator 501 may also allow the user to enter a Spanish word, which is then translated into and English word, then translated into a sign language with the displaying of the associated video clip. In addition, translator 501 may be configured to display video clips of sign language translations in sign languages other than ASL. For example, the video clips may be of sign language translations in a Chinese sign language. In addition, translator 501 can be configured to display 505 more than one video in a split screen such that one side of display 505 portrays a video translation in ASL while the other side of the display 505 portrays a video translation in a foreign sign language.

As shown in FIG. 6, translator 501 is configured with a touch screen keyboard 515 on display 505 during word entry mode. The preferred embodiment of translator 501 does not have connection provisions for the attachment of an external keyboard. By expressly limiting unnecessarily functionalities, such as provisions for an external keyboard, translator 501 is small, inexpensive, and portable. Furthermore, in the preferred embodiment, translator 501 is configured to exclude wireless data transferring capabilities. For example, in the preferred embodiment, translator 501 is not able to able wireless download voice or data. In other words, translator 501 is not meant to be a phone device. Instead, translator 501 is configured to provide translating capabilities without extraneous functionalities in order to provide the user with a simple and efficient device capable of translating words into sign language video.

In the preferred embodiment, translator 501 is a limited function device which is configured to uniquely provided translations of words, letters, numbers, and pronouns into video clips of a person performing the associated sign language. In the preferred embodiment, translator 501 is not an all purpose laptop computer, personal digital assistant (PDA), phone, or other multi-use device having a variety of functionalities.

Figure 8A:
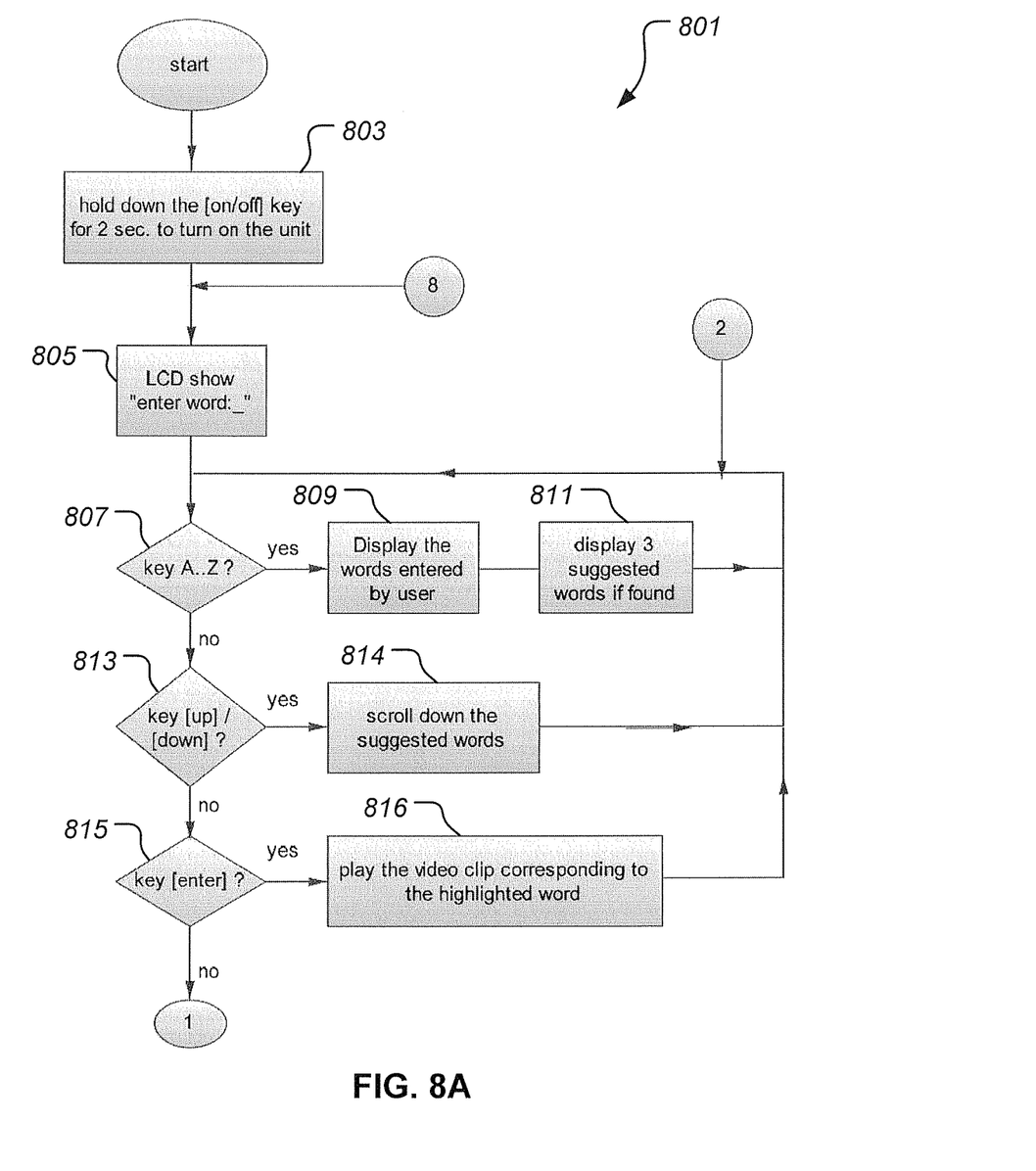
FIGS. 8A-8E are operational flowcharts of the preferred embodiment of the digital sign language translator according to the present application.

Referring now to FIGS. 8A-8E, the preferred functionality of translator 501 is illustrated as a flowchart 801. In FIG. 8A, flowchart 801 begins in step 803 with the user holding the on/off key for approximately two seconds in order to turn on translator 501. Step 805 includes prompting the user to enter a word that the user would like to have translated. In step 807, if the user enters letters which make up a word, translator 501 will display the words entered by the user, as set forth in step 809. Step 811 includes displaying three suggested words, if suggested words are found. If the user does not enter letters according to step 807, then the process continues with step 813. In step 813, if the user selects the up or down key, translator 501 will scroll through suggested words, as set forth in step 814. If the user does not select the up or down keys according to step 813, then the process continues with step 815. If the user selects the enter key in step 815, translator 501 plays a video clip corresponding to the highlighted word, as set forth in step 816. If the user does not select the enter key according to step 815, then the process continues as set forth in FIG. 8B.

Figure 8B:
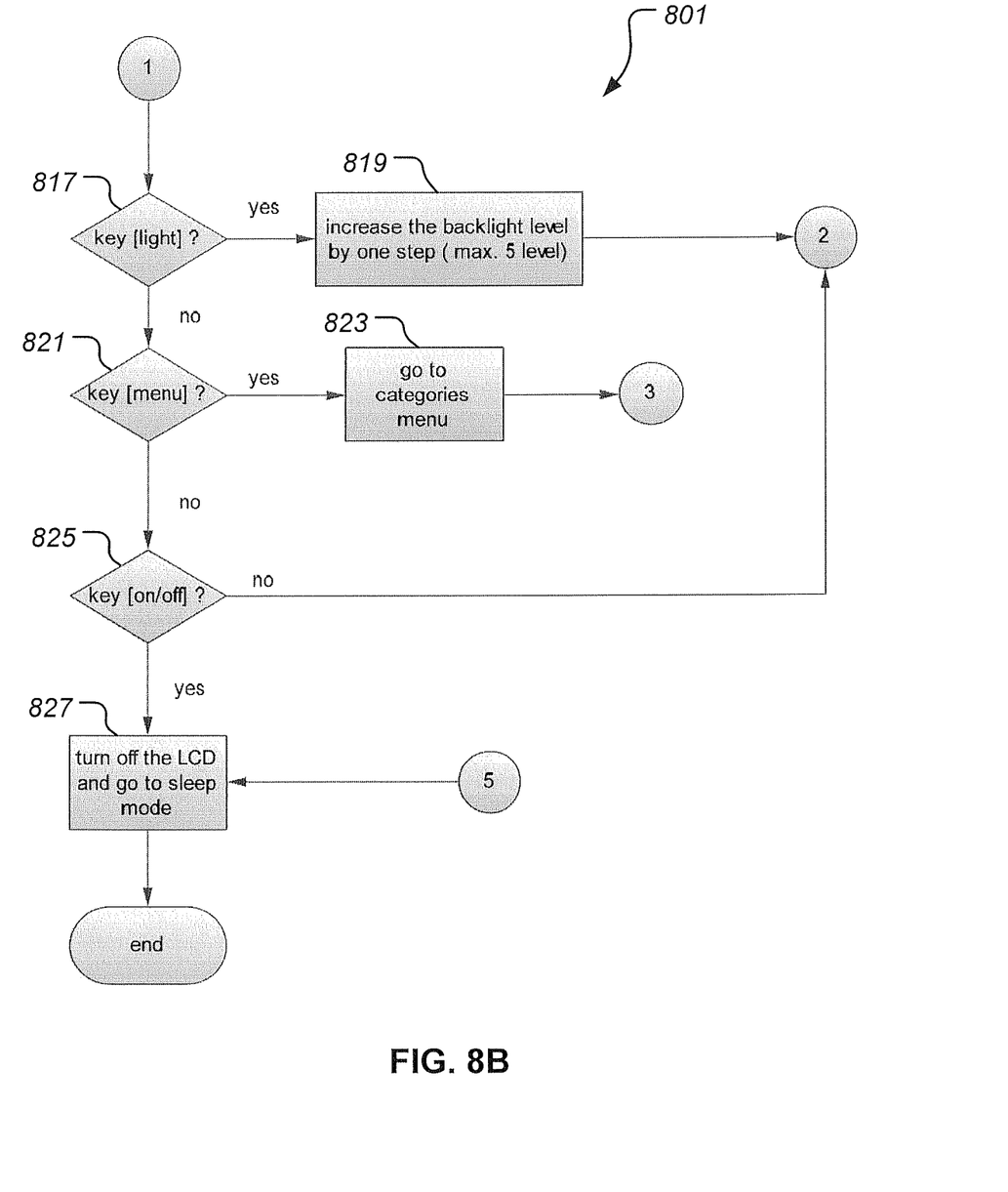

Referring now to FIG. 8B, if the user selects the light button in step 817, then the user can adjust the backlight level as set forth in step 819. Afterwards, the user is directed back to step 807 (shown in FIG. 8A). If the user does not select the light button according to step 817, then the process continues with step 821. If the user selects the menu key in step 821, translator 501 displays a categories menu in step 823. Afterwards, the user is directed to step 829 (shown in FIG. 8C). If the user does not select the menu button according to step 821, then the process continues with step 825. If the user selects the on/off key in step 825, translator 501 goes into sleep mode in step 827, and the process ends. If the user does not select the on/off button in step 825, the user is directed to step 807 in FIG. 8A.

Figure 8C:
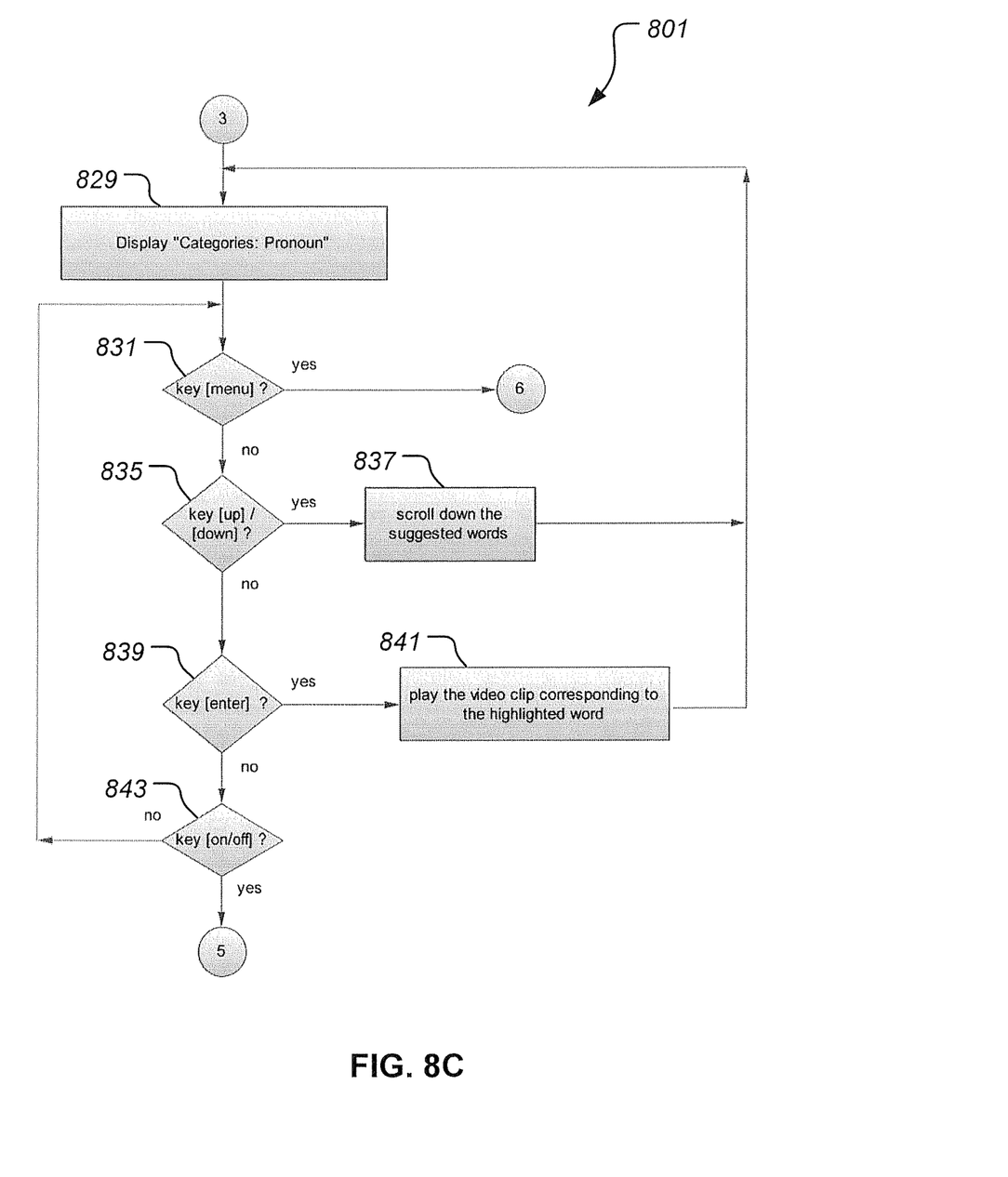

Referring now to FIG. 8C, step 829 includes the display of the pronoun category. Next, if the user selects the menu button in step 831, then translator 501 will display a numbers category in step 833 (shown in FIG. 8D). If the user does not select the menu button as set forth in step 831, then the process continues with step 835. If the user selects an up/down key, in accordance with step 835, then the user can scroll through suggested words in step 837. If the user does not select an up/down keys, in accordance with step 835, then the process continues with step 839. If the user selects the enter button in step 839, then the process continues to step 841 with translator 501 playing a video clip corresponding to the highlighted word. If the user does not select the enter key as set forth in step 839, then the process continues with step 843. If the user selects the on/off button in step 843, translator 501 will go into sleep mode, as depicted in step 827 of FIG. 8B, and the process ends.

Figure 8D:
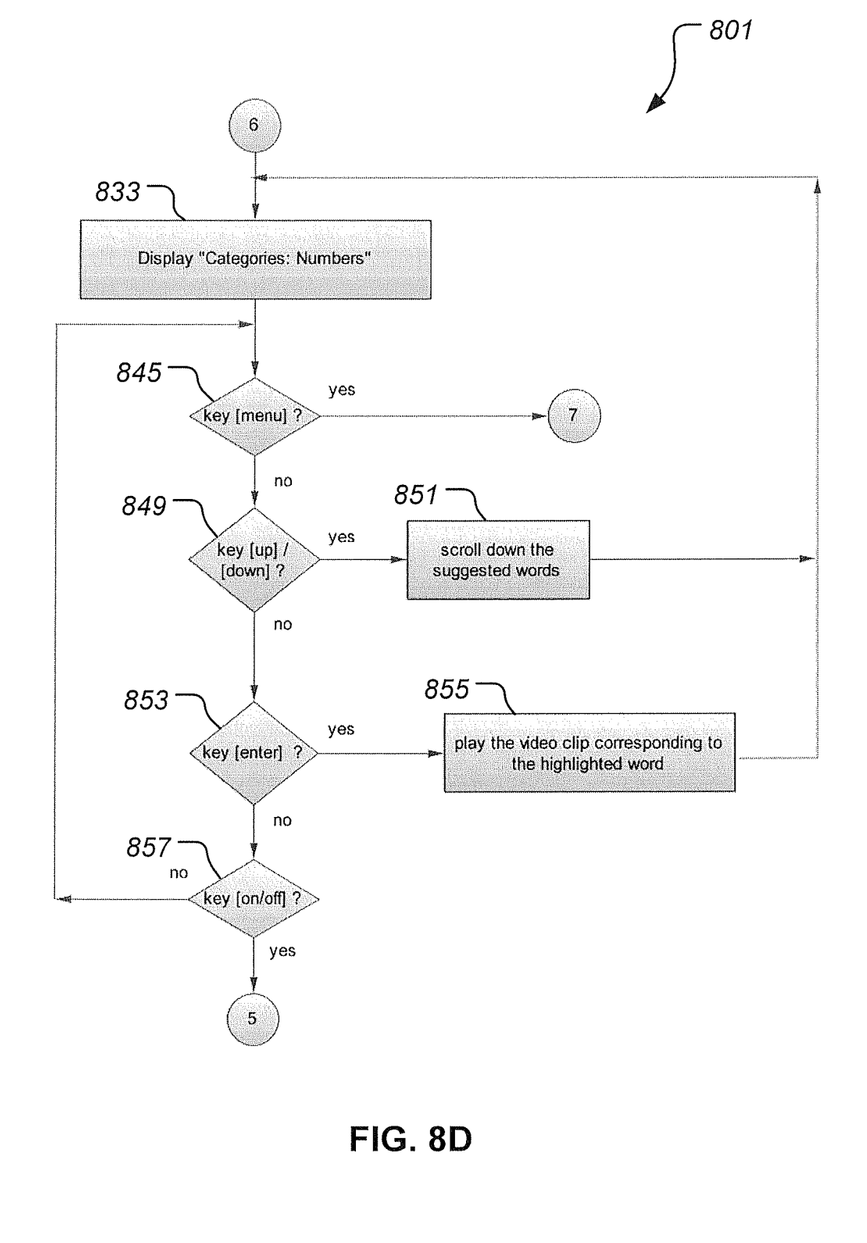

Referring now to FIG. 8D, step 833 includes displaying a numbers category. If the user selects the menu key in step 845, translator 501 displays the ABC's (letters) category in step 847 (shown in FIG. 8E). If the user does not select the menu key according to step 845, then the process continues with step 849. If the user selects an up/down key, in accordance with step 849, then the user is able to scroll through suggested words in step 851. If the user does not select an up/down key in accordance with step 849, then the process continues with step 853. If the user selects the enter key, as set forth in step 853, then step 855 includes translator 501 playing a video clip corresponding to the highlighted word. If the user does not select the enter key, as set forth in step 853, then the process continues with step 857. If the user selects the on/off key in step 857, translator 501 will go into sleep mode, as depicted in step 827 of FIG. 8B, and the process ends.

Figure 8E:
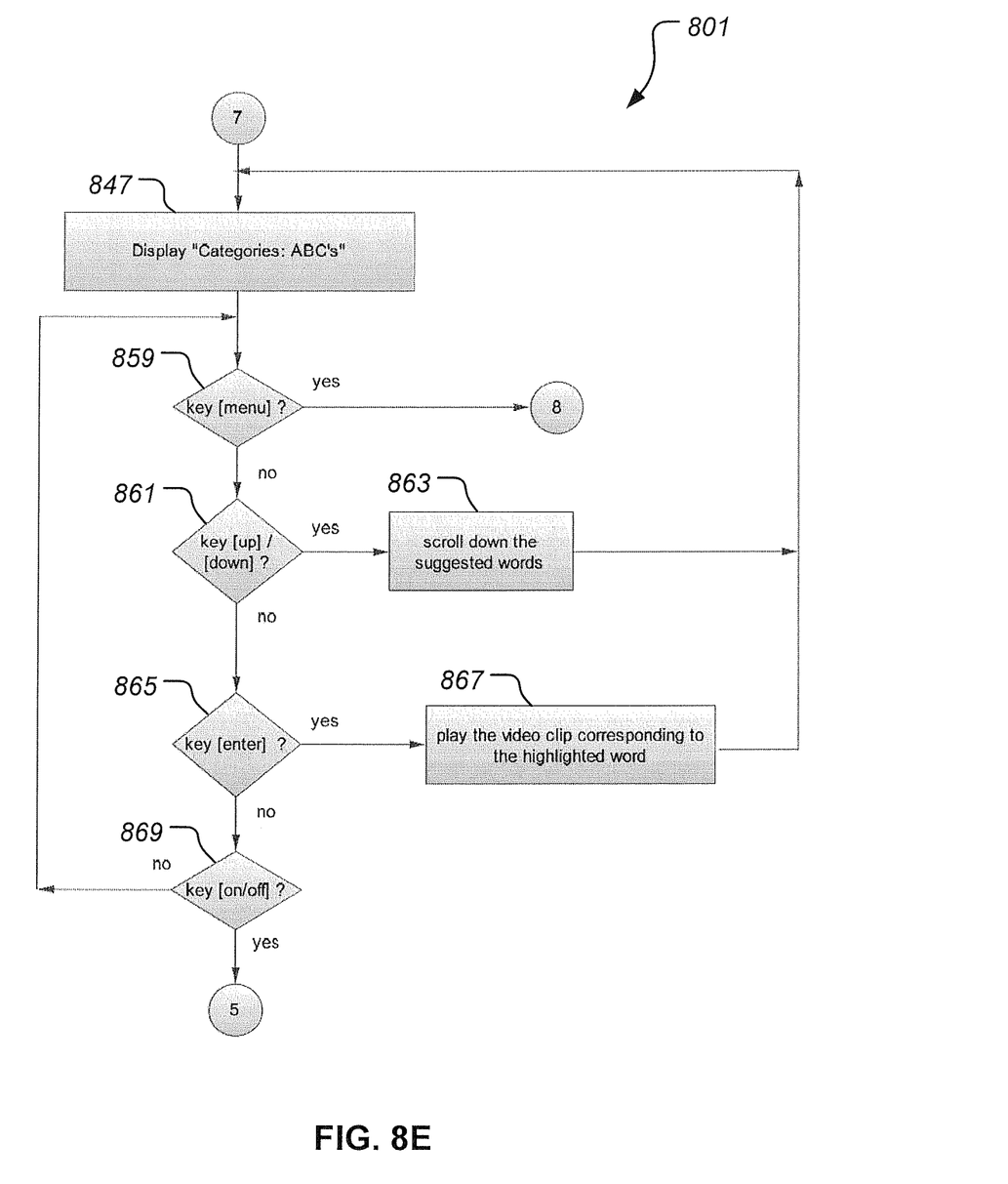

Referring now to FIG. 8E, step 847 includes displaying an ABC'S (letters) category. If the user selects the menu key in step 859, the user is prompted to enter a word, as set forth in step 805 (shown in FIG. 8A). If the user does not select the menu key according to step 859, then the process continues with step 861. If the user selects an up or down key, as set forth in step 861, then the user is able to scroll through suggested words in step 863. If the user does not select an up/down key, according to step 861, then the process continues with step 865. In step 865, if the user selects the enter key, then translator 501 plays a video clip corresponding to the highlighted word, as set forth in step 867. If the user does not select the enter key according to step 865, then the process continues with step 869. If the user selects the on/off key in step 869, translator 501 will go into sleep mode, as depicted in step 827 of FIG. 8B, and the process ends.

It is apparent that a system with significant advantages has been described and illustrated, including a small hand-held device that can quickly, easily, and accurately translate from text to sign language.

The particular embodiments disclosed above are illustrative only, as the system may be modified and practiced in different but equivalent manners apparent to those skilled in the art having the benefit of the teachings herein. The particular embodiments disclosed herein may be altered or modified, and all such variations are considered within the scope and spirit of the present application. Although the system of the present application is shown in a limited number of forms, it is not limited to just these forms, but is amenable to various changes and modifications without departing from the spirit thereof.

We claim:

1. A digital sign language translator, comprising:
a case configured to be supported by a hand of a user;
a touch screen display located on a face of the case;
a microprocessor for selectively translating at least one of a selected word, letter, and number into at least one video clip of an actual person performing a sign language translation of the at least one of the word, letter, and number;
an internal memory device for storing a standard database, the standard database including the at least one of the selected word, letter, and number and the corresponding video clip of an actual person performing the sign language translation of the at least one of the selected word, letter, and number;
a memory card slot for receiving an external memory card, the external memory card having an expanded vocabulary to supplement the standard database contained on the internal memory;
a battery for powering the translator; and
a keyboard selectively shown on the display;
wherein the digital sign language translator is small and portable so as to be conveniently transported by the user in order to be handily available to the user as desired; and
wherein the translator is configured so that data can only be transferred to the translator through the memory card slot so as to prevent unauthorized downloading and copying of the standard database.

2. The digital sign language translator according to claim 1, wherein the face of the case is approximately 3.1 inches high and 5.6 inches wide.

3. The digital sign language translator according to claim 1, wherein the battery is capable of being recharged via a USB cable attached to the translator in a USB cable slot, the slot being configured to prevent data transfer to and from the translator via the USB cable.

4. The digital sign language translator according to claim 1, wherein the translator is configured to prevent the transfer of any wireless data to and from the translator.

5. The digital sign language translator according to claim 1, wherein the translator is configured to selectively operate the display in a video mode and a word entry mode, the video mode includes the playing of the video clip, while the word entry mode includes keyboard functionality for entering the words, letters, and numbers the user seeks to have translated.

6. The digital sign language translator according to claim 1, further comprising:
a light button for selectively changing a contrast of the display.

7. The digital sign language translator according to claim 1, further comprising:
a menu button for selectively choosing a menu.

8. The digital sign language translator according to claim 1, further comprising:
a power button for selectively turning the translator on and off.

9. The digital sign language translator according to claim 1, further comprising:
a stand for supporting the translator on a surface.

10. The digital sign language translator according to claim 1, wherein the translator operates in a word entry mode in which the user enters a first letter of a desired word such that a list of words which start with the first letter are displayed on the display such that the user can then either choose the word or enter additional letters of the desired word.

11. The digital sign language translator according to claim 1, wherein the translator provides multiple sign language translations according to different dialects and base languages.

12. The digital sign language translator according to claim 1, wherein the translator is configured to translate a foreign text into an English text, and translate the English text into a video of a sign language.

13. The digital sign language translator according to claim 1, wherein the translator is configured to translate a foreign text directly into a video of a sign language.

14. The digital sign language translator according to claim 1, wherein the expanded library includes a foreign sign language that is supplemental to the sign language used on the standard database.

15. A smart phone having an integrated digital sign language translator, comprising:
a case configured to be supported by a hand of a user;
a touch screen display located on a face of the case;
a microprocessor for selectively translating a text into a video clip of an actual person performing a sign language translation of the text;
a memory device for storing a database of text and the video clip of an actual person performing the sign language translation of the text;
a battery for powering the smart phone; and
a keyboard selectively shown on the touch screen display;
wherein the smart phone is small and portable so as to be conveniently transported by the user in order to be handily available to the user as desired;
wherein the smart phone is configured to make and receive wireless phone calls in addition to being configured for translating a text into a video clip of an actual person performing a sign language translation of the text; and
wherein the translator is configured so that data can only be transferred to the translator through the memory card slot so as to prevent unauthorized downloading and copying of the database.

* * * * *